| (12) | United States Patent<br>Nakazawa et al. | (10) Patent No.: US 7,335,322 B2<br>(45) Date of Patent: Feb. 26, 2008 |
|---|---|---|

(54) PHOTOCHROMIC MATERIAL COMPRISING COMPOSITE OXIDES

(75) Inventors: Akira Nakazawa, Kobe (JP); Tsutae Shinoda, Akashi (JP)

(73) Assignee: Shinoda Plasma Corporation, Akashi (JP)

( * ) Notice: Subject to any disclaimer, the term of this patent is extended or adjusted under 35 U.S.C. 154(b) by 0 days.

(21) Appl. No.: 11/369,789

(22) Filed: Mar. 7, 2006

(65) Prior Publication Data

US 2006/0151757 A1   Jul. 13, 2006

Related U.S. Application Data

(62) Division of application No. 10/438,951, filed on Mar. 15, 2003, now Pat. No. 7,041,392.

(51) Int. Cl.
   *G02B 5/23* (2006.01)
   *H01B 1/02* (2006.01)
(52) U.S. Cl. ............... 252/586; 252/584; 252/520.1
(58) Field of Classification Search ............... 252/586
   See application file for complete search history.

(56) References Cited

U.S. PATENT DOCUMENTS

| 4,780,422 | A | * | 10/1988 | Mitani et al. | ............... 436/524 |
| 5,838,483 | A | | 11/1998 | Teowee et al. | ............. 359/265 |
| 6,057,039 | A | * | 5/2000 | Takeshita et al. | ............ 428/447 |
| 6,497,958 | B1 | * | 12/2002 | Abe et al. | ................ 428/411.1 |
| 2002/0024752 | A1 | * | 2/2002 | Ando et al. | ................ 359/885 |

FOREIGN PATENT DOCUMENTS

| EP | 0526712 A1 * | 10/1992 |
| WO | WO0142381 A1 * | 6/2001 |

* cited by examiner

*Primary Examiner*—Randy Gulakowski
*Assistant Examiner*—Timothy J. Kugel
(74) *Attorney, Agent, or Firm*—Greer, Burns & Crain, Ltd.

(57) ABSTRACT

A photochromic includes a laminated film including a composite oxide film composed of at least two elements selected from the group consisting of Ti, Mn, Co, Ni, Zn, and Sn, and the group consisting of Mg, Al, and Si, respectively, and a transparent conductive film, wherein the light transmission property is changed by UV irradiation.

7 Claims, 10 Drawing Sheets

PHOTOCHROMIC MATERIAL COMPRISING COMPOSITE OXIDES

This is a divisional of application Ser. No. 10/438,951, filed Mar. 15, 2003, now U.S. Pat. No. 7,041,392.

BACKGROUND OF THE INVENTION

1. Field of the Invention

The present invention relates to a method for producing a photochromic comprising a composite oxide that changes its light transmittance by UV irradiation, and a method for producing a photochromic material. In particular, the present invention relates to a photochromic suitable for printing materials, optical instruments, recording materials, display materials, dimming materials, photosensitive elements, clothes and ornaments.

2. Description of the Related Art

Organic materials such as chromene photochromic materials have been known in the art as materials that changes their light transmission property by irradiating light.

Although organic materials such as the chromene photochromic materials become opaque by several seconds of light irradiation, and return to a transparent state within several seconds to several minutes by leaving it in a dark place, it has been a problem that a stable light transmission property cannot be obtained once the material has become opaque by light irradiation.

SUMMARY OF THE INVENTION

The present invention provides a photochromic film comprising a laminate including a composite oxide film composed of a composite oxide of at least two elements selected from the group consisting of Ti, Mn, Co, Ni, Zn, and Sn, and the group consisting of Mg, Al, and Si, respectively, and a transparent conductive film. The light transmission property of the photochromic film is changed by UV irradiation.

The present invention provides a photochromic film comprising a laminated film including a composite oxide of at least two elements selected from the group consisting of Ti, Mn, Co, Ni, Zn, and Sn and the group consisting of Mg, Al and Si, respectively, and a transparent conductive film. At least one of the composite oxide film and the transparent conductive film are formed on both faces of the other film, and the light transmission property is changed by UV irradiation.

The present invention provides a photochromic film comprising a laminated film composed of a composite oxide comprising two elements selected from the group consisting of Ti, Mn, Co, Ni, Zn and Sn, and the group consisting of Mg, Al, and Si, respectively. The composite oxide contains transparent conductive particles.

In some of the above embodiments, the composite oxide comprises tin and magnesium.

In some of the above embodiments, the atomic ratio of the number of tin atoms to the number of magnesium atoms contained in the composite oxide is in the range of 3:7 to 7:3 in the photochromic film.

In some of the above embodiments, the proportion of defects of oxygen atoms in the composite oxide is 1% to 70% in the photochromic film.

In some of the above embodiments, the transparent conductive film comprises indium oxide as a main component.

In some of the above embodiments, the transparent conductive particles comprise indium oxide as a main component in the photochromic film.

The present invention provides a photochromic material comprising a powder containing a composite oxide of at least two elements selected from the group consisting of Ti, Mn, Co, Ni, Zn and Sn, and the group consisting of Mg, Al and Si, respectively. The composite oxide contains transparent conductive particles.

In above the photochromic material, the composite oxide comprises tin and magnesium in the photochromic material.

In some of the above embodiments, the ratio of the number of tin atoms to the number of magnesium atoms contained in the composite oxide is in the range of 3:7 to 7:3 in the photochromic material.

In some of the above embodiments, the proportion of defects of oxygen atoms in the composite oxide is 1% to 70% in the photochromic material.

In some of the above embodiments, the transparent conductive particles comprise indium oxide as a main component in the photochromic material.

The present invention provides a method for manufacturing a photochromic material, comprising pulverizing the laminated photochromic film to form a powdery photochromic material.

The present invention provides a method of producing a photochromic film, comprising forming a compound oxide film by a process selected from a coating-pyrolysis process, a sol-gel process, a chemical vapor deposition (CVD) process, a vapor deposition process, an ion plating process, and a sputtering process.

In the method above, the compound oxide film is formed by a coating-pyrolysis process using a fatty acid salt or a fatty acid salt derivative as a raw material.

In the method above, a method of producing a photochromic film, comprises forming a compound oxide film by a process selected from a coating-pyrolysis process, and a sol-gel process.

In the method above, the compound oxide film is formed by a coating-pyrolysis process using a fatty acid salt or a fatty acid salt derivative as a raw material.

In some of the above embodiments, a portion of the photochromic film is irradiated with light at a wavelength of 500 nm or less to form an opaque irradiated portion.

In the photochromic film above, the opaque portion formed by ultraviolet irradiation becomes transparent by heating.

DESCRIPTION OF THE REFERRED EMBODIMENTS

The action principle by which the light transmission property of the photochromic film according to the present invention changes by UV irradiation is shown in FIG. 1 using the junction between a indium oxide film doped with tin oxide (referred to as ITO film hereinafter) and a composite oxide film comprising tin and magnesium as an example. Although the action principle has not been fully comprehended, it may be conjectured as follows.

Figure 1A:
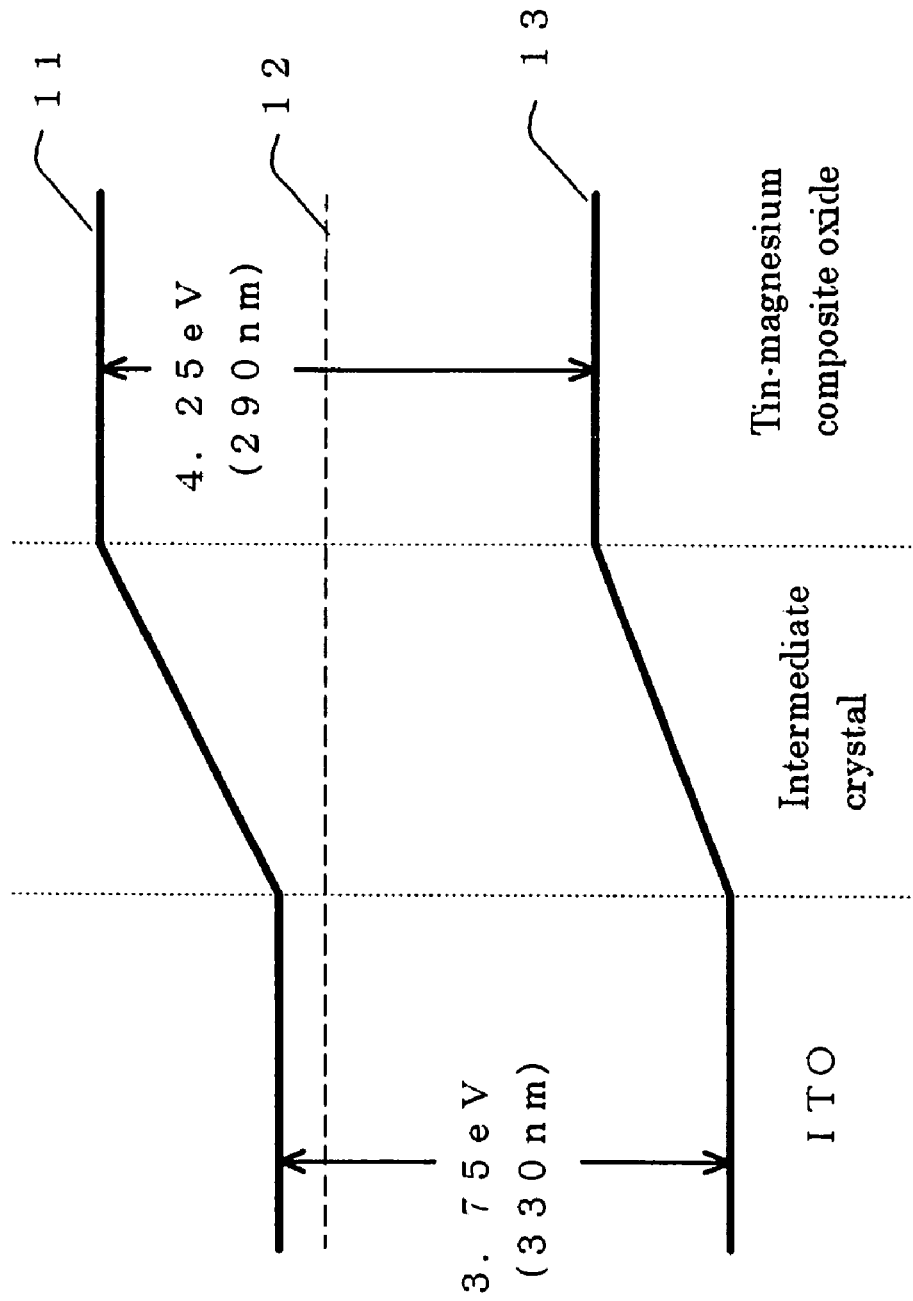
FIGS. 1A-C shows an action principle of the photochromic film according to the present invention by which light transmission property changes by UV irradiation.

The band width at the junction between ITO and tin-magnesium composite oxide is thought as illustrated in FIG. 1A. ITO, an intermediate crystal and tin-magnesium composite oxide are illustrated from the left side to the right side in the drawing. The band gap between the conduction band 11 of ITO and valence electron band 13 is 3.75 eV (measured value), and the band gap between the conduction band of tin-magnesium composite oxide and valence electron band is 4.25 eV. The Fermi level 12 of ITO is thought to be positioned close to the conduction band 11, and the Fermi level of tin-magnesium composite oxide is thought to be positioned between the conduction band 11 and valence electron band 13.

Figure 1B:
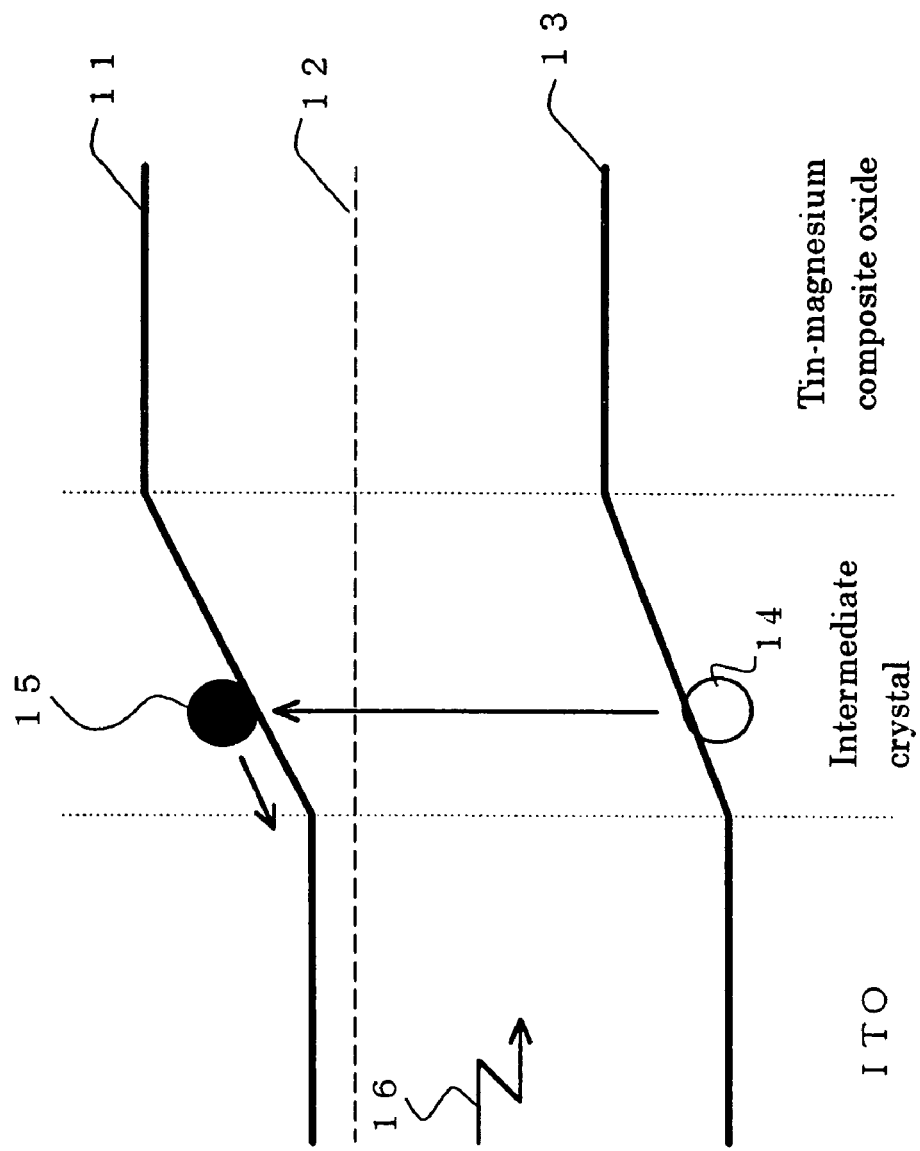

Electrons 15 in the valence electron band 13 at the intermediate crystal is excited up to the conduction band 11 by irradiation of UV light 16 while the UV light is being irradiated as shown in FIG. 1B, and the excited electrons 15 are transferred into the conduction band of ITO due to a gradient of the conduction band 11 close to the Fermi level 12 of ITO. On the other hand, positive holes 14 as vacancies of the electrons are left behind in the valence electron band 13.

Figure 1C:
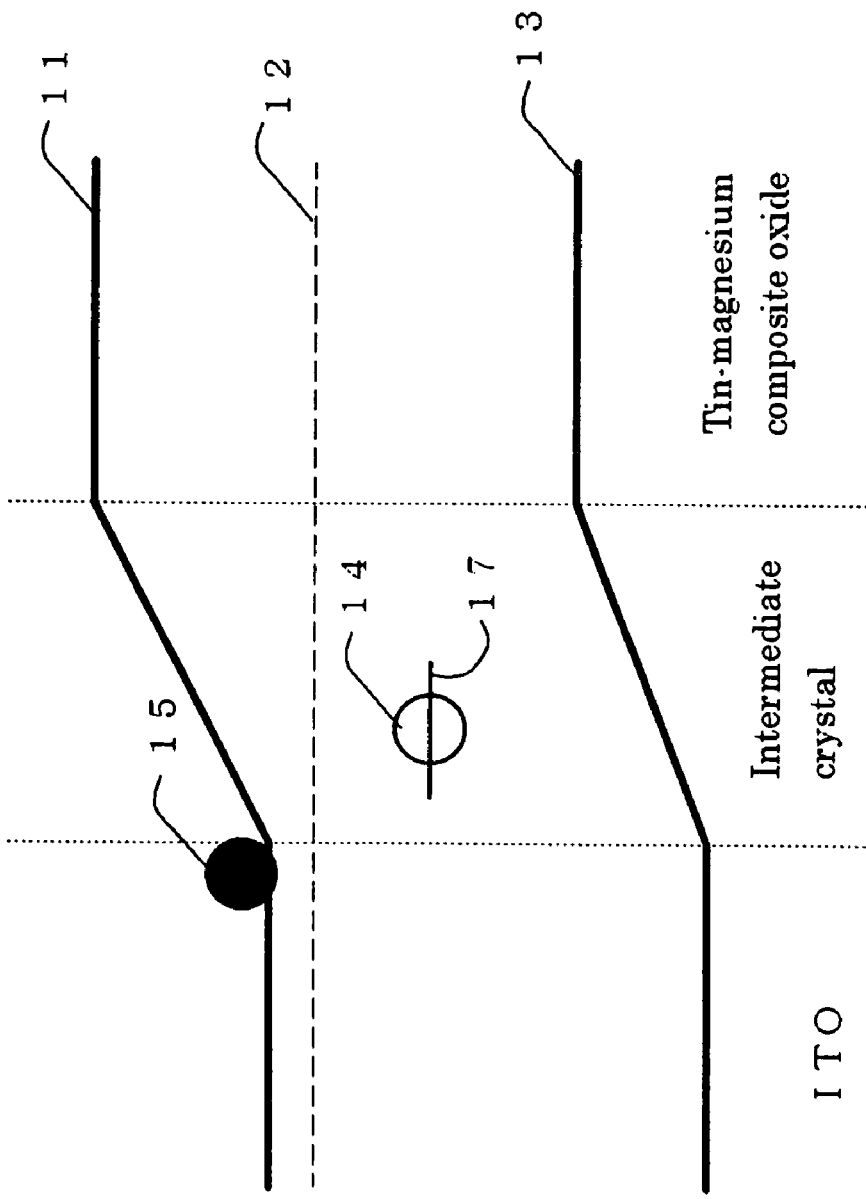

Since there is a time lag before recombination of the positive holes 14 in the intermediate crystal after UV irradiation shown in FIG. 1C, where the Fermi level 12 of ITO is close to the conduction band 11, atomic arrangement is changed during this time lag. The level that has involved the positive holes 14 moves between the band gaps to form a new level 17, and this level serves as a color level.

Since a coloring reaction takes place at the composite oxide side at the interface between the composite oxide and ITO by the mechanism as described above, a larger photochromic effect of the present invention can be obtained as the incidence of the interface between the composite oxide and ITO is larger.

While the photochromic film comprising tin-magnesium composite oxide and ITO has been described above as an example, the same effect may be obtained between a composite oxide of at least two elements, one of the elements selected from the group consisting of Ti, Mn, Co, Ni, Zn, and Sn, and the other of the two elements selected from the group consisting of Mg, Al and Si, respectively, and ITO by the same action mechanism as described above. The transparent conductor is not restricted to ITO, and any materials such as tin oxide and zinc oxide may be used, so long as they are transparent conductive materials exhibiting characteristics of n-type semiconductors.

First Embodiment

FIG. 2 is provided for describing the method for producing the photochromic film according to the present invention, and shows a manufacturing process for forming tin-magnesium composite oxide by a heat decomposition method after application.

Figure 2A:
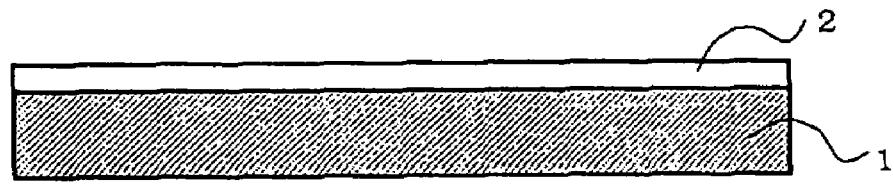
FIGS. 2A-C shows the method for producing the photochromic film according to the first embodiment of the present invention.

As shown in FIG. 2A, an ITO film 2 with a thickness of 0.2 μm is deposited on a glass substrate 1 as a supporter by sputtering.

Figure 2B:
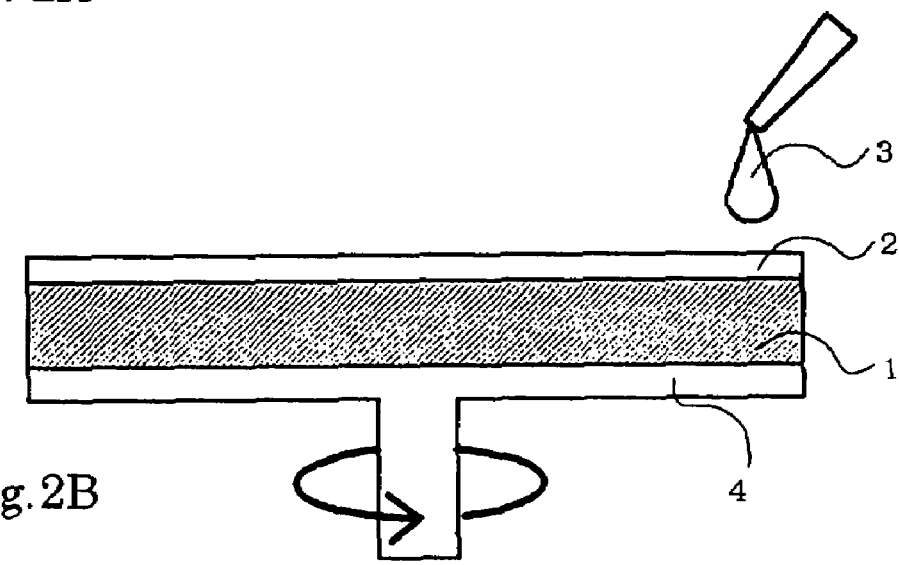

As shown in FIG. 2B, 10 g each of tin caproate and magnesium caproate are dissolved in 10 g of ethyl alcohol, and this solution as an application fluid 3 is applied on the ITO film using a spinner 4 rotating at 1200 rpm. After the application, the application fluid is dried for 10 minutes in a drying furnace at 60° C.

Figure 2C:
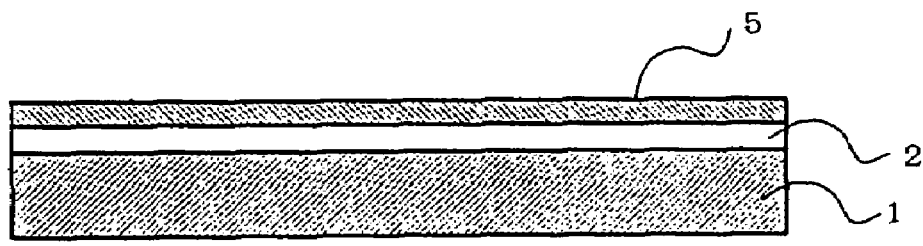

After drying the application fluid applied on the ITO film 2, the glass substrate 1 is baked in a baking furnace at 400° C. for 1 hour, thereby forming a tin-magnesium composite oxide film 5 with a thickness of 0.4 μm on the ITO film 2 as shown in FIG. 2C. The content of oxygen atom defects is larger as the baking temperature is lower, and smaller as the baking temperature is higher. The content of defects becomes larger as the oxygen concentration is larger in the baking atmosphere, while the content of defects becomes smaller as the oxygen concentration is smaller in the baking atmosphere. In other words, the content of oxygen atom defects in the composite oxide can be controlled by the baking temperature and oxygen concentration in the baking atmosphere. The content of oxygen atom defects is preferably in the range of 1 to 70%, because the light transmission property is hardly changed by UV irradiation under the conditions out of the range described above.

Transmittance of visible light could be changed from 95% to 30% by irradiating a light with a wavelength of 365 nm for 5 minutes at a luminous energy of 30 mW/cm2 to the photochromic film comprising the ITO film 2 and tin-magnesium composite oxide film 5 prepared as described above. No change of transmittance of the visible light was observed by leaving the photochromic film under a room light for 12 months after the change of transmittance by UV irradiation.

While tin caproate and magnesium caproate were exemplified as starting materials, any fatty acid salts of tin and magnesium may be used. However, the weight of the starting material to be dissolved is different when the starting material other than the fatty acid salt of tin caproate or magnesium caproate is used. The atomic ratio in the composite oxide film can be changed by changing the weight ratio of these starting materials dissolved in ethyl alcohol. The ratio of the number of tin atoms to the number of magnesium atoms is preferably in the range of 3:7 to 7:3, since the light transmission property is hardly changed by UV irradiation out of the range described above.

While the heat decomposition method after coating was described above as the method for forming the composite oxide film, a sol-gel method, CVD method, vacuum deposition method, ion-plating method and sputtering method may be used. In the CVD method, $(CH_3)_2SnCl_2$ and $Mg(C_5H_7O_2)_2$ are evaporated as the starting material gases, a plasma is generated by mixing oxygen and nitrogen, and the vapors are deposited on a glass substrate heated at 500° C. Tin oxide and magnesium oxide may be used as vacuum deposition sources, or metallic tin and magnesium may be deposited in an oxygen atmosphere when the vacuum evaporation method is employed. On the other hand, tin oxide and magnesium oxide are used as sputtering targets when the sputtering method is employed, and the film is deposited by controlling the sputtering atmosphere and substrate temperature.

The transparent conductive material is not restricted to ITO, and materials such as tin oxide and zinc oxide may be used. The deposition method is not restricted to the sputtering method, and the vacuum deposition method, ion-plating method and CVD method may be used.

Second Embodiment

In second embodiment shown in FIG. 3, a photochromic film having a laminated film structure in which the ITO film is sandwiched between the two composite oxide films is formed. As shown in FIG. 3A, a first composite oxide film 5a comprising tin oxide and magnesium oxide with a thickness of 0.4 μm is formed by the methods described in shown in FIGS. 2A and 2B in First Embodiment at first. Then, as shown in FIG. 3B, the ITO film 2 with a thickness of 0.2 μm is formed on the composite oxide film 5a using the sputtering method. As shown in FIG. 3C, a second composite oxide film 5b comprising tin oxide and magnesium oxide with a thickness of 0.4 μm is formed on the ITO film 2 by the same method as forming the first composite oxide film 5a. Consequently, the photochromic film comprising the ITO film 2 sandwiched between the two composite oxide films 5a and 5b is obtained.

Figure 3A:
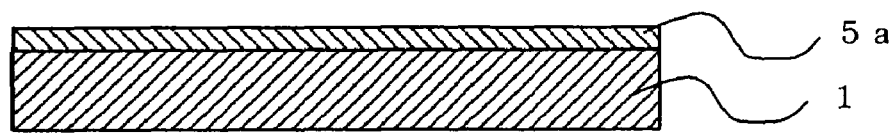
FIGS. 3A-D shows the method for producing the photochromic film according to the second embodiment of the present invention.
Figure 3B:
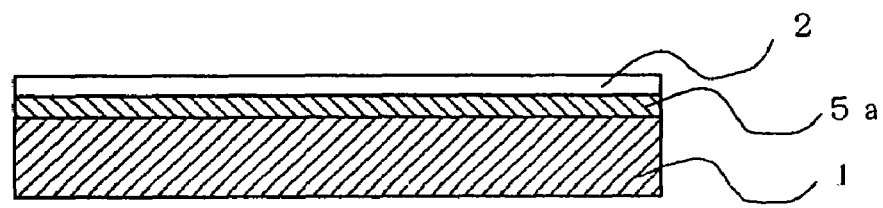
Figure 3C:
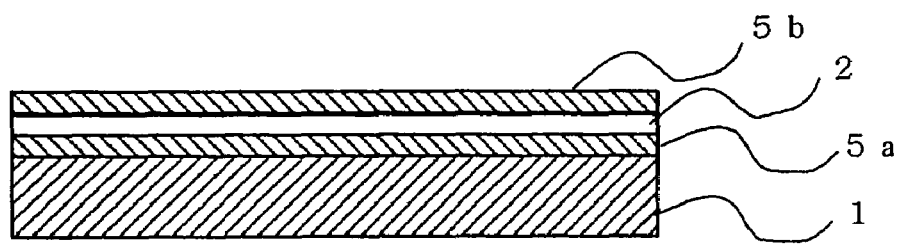
Figure 3D:
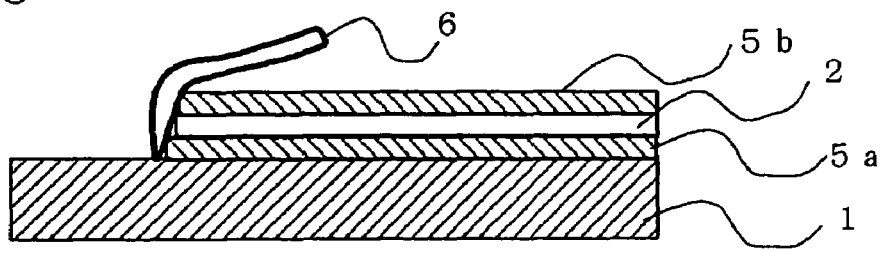
Figure 4:
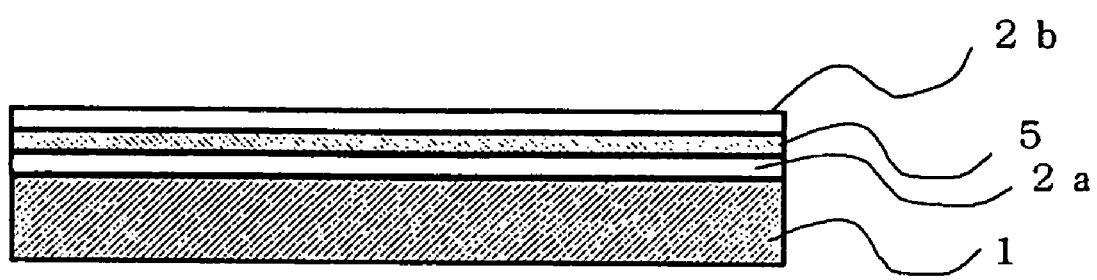
FIG. 4 shows a modification of the method for producing the photochromic film according to Example 2 of the present invention.

As a deformation of the methods described above, the ITO film 2a with a thickness of 0.2 μm is formed on the glass substrate 1 as shown in FIG. 4. Then, the composite oxide film 5 with a thickness of 0.4 μm is formed on the ITO film 2a, followed by forming the ITO film 2b with a thickness of 0.2 μm thereon. This photochromic film is considered to have an inverse lamination structure to the structure shown in FIG. 3, wherein the composite oxide film is sandwiched between the ITO films.

The laminated structures in Second Embodiment having a sandwich structure of the composite oxide layer and ITO layer shown in FIGS. 3 and 4 are preferable over the lamination film structure of the composite oxide film and ITO film, since the interfaces between the composite oxide and ITO increases.

However, a photochromic material similar to the photochromic material as shown in Third Embodiment below may be obtained as a fine powder by the steps comprising peeling the photochromic from the glass substrate 1 using a metallic scraper 6, and pulverizing the peeled film as shown in FIG. 3D. The photochromic in First Embodiment may be used as a fine powder of the photochromic material by the same method as described above.

Figure 6:
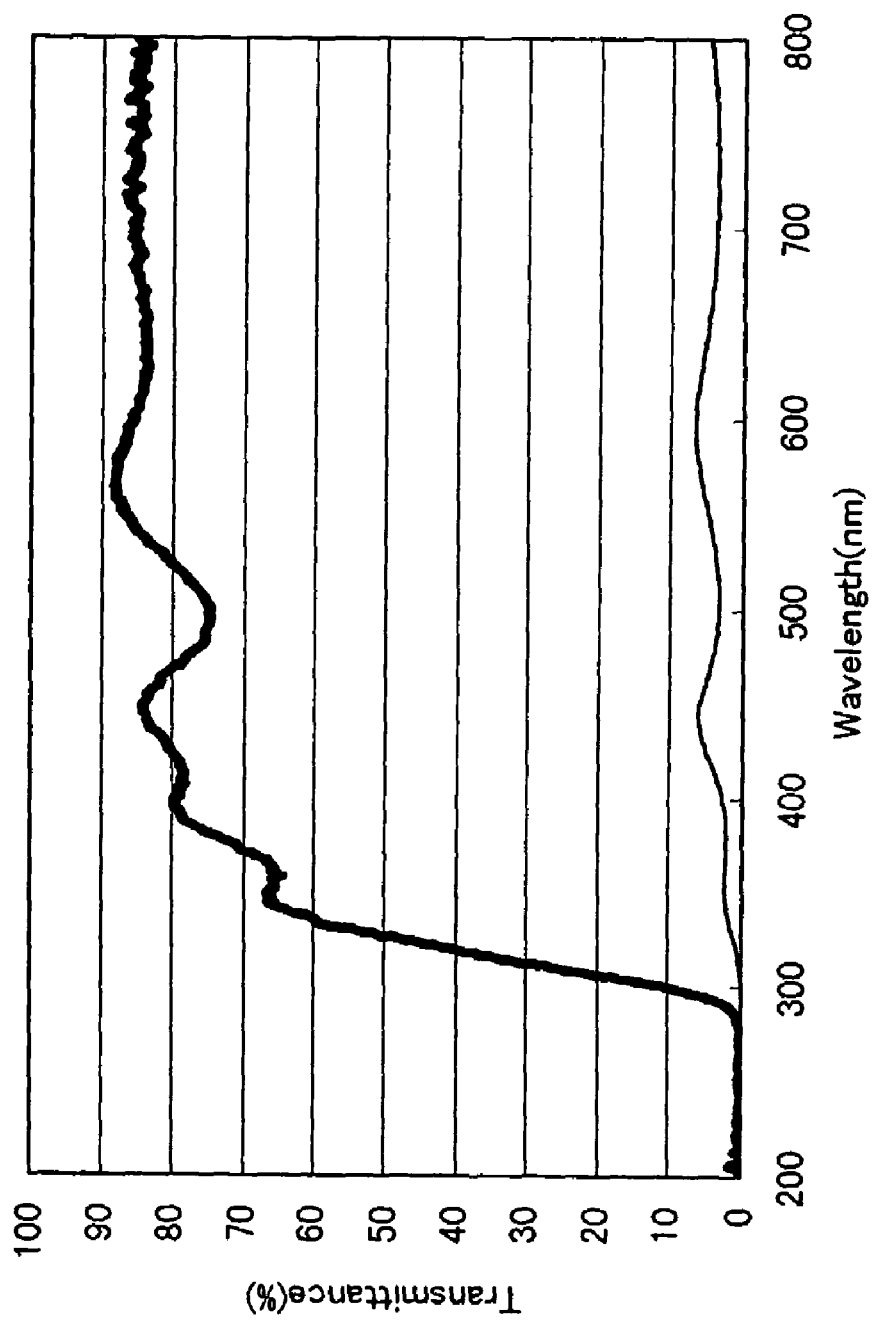
FIG. 6 shows the light transmission properties of the photochromic film according to the present invention before and after UV irradiation.

FIG. 6 is a graph showing the transmittance of the photochromic film obtained in Second Embodiment. The graph shows data of the transmittance of the photochromic film before and after irradiating 365 nm UV light with a luminous energy of 30 mW/cm2 for 5 minutes. The vertical axis shows the transmittance relative to the transmittance (%) of air as 100%, and the horizontal axis shows the wavelength of the light. The transmittance was measured with UV-3100S made by Shimadzu Co. The bold line indicates the transmittance before UV irradiation, and the slender line indicates the transmittance after UV irradiation. The transmittance at the wavelength of 550 nm decreased to 4.7% after UV irradiation from 86% before UV irradiation, and no changes of the transmittance were observed after leaving the irradiated photochromic film under a room light for 6 months.

Third Embodiment

Figure 5A:
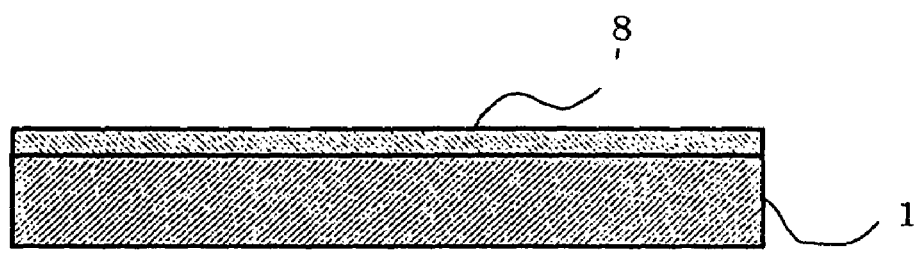
FIGS. 5A-B shows the method for producing the photochromic film according to the third embodiment of the present invention.

In Third Embodiment shown in FIG. 5, the photochromic material comprises a single layer. An application fluid is prepared by dissolving 10 g each of tin caproate and magnesium caproate in 10 g of ethyl alcohol, followed by dispersing 0.1 g of a powder of ITO with a particle diameter of 0.04 μm. An application film is formed by applying the application fluid on the glass substrate 1 as a supporter as shown in FIG. 5A by the same method as in FIG. 2B. After drying the application fluid, the glass substrate 1 is baked in a baking furnace at 400° C. for 1 hour, thereby forming the photochromic material 8 with a thickness of 0.4 μm comprising the tin-magnesium composite oxide film containing 0.04 μm of the ITO powder. A light transmission property equivalent to the light transmission property of the photochromic film in the Second Embodiment was obtained by irradiating UV light to the photochromic material 8 thus formed.

Alternatively, an application film was formed by applying an application fluid, prepared by dissolving 10 g each of tin caproate and magnesium caproate in 10 g of ethyl alcohol, on the glass substrate by the same method as in FIG. 2B. After drying the application fluid, the glass substrate was baked in a baking furnace at 400° C. for 1 hour, and the composite oxide film formed was scraped from the glass substrate to form a scale-like powder with a size of about 1 μm. An application fluid was prepared by dissolving tin caproate and indium caproate in ethyl alcohol, and an application film was prepared by applying the application fluid and the scale-like powder material on the glass substrate by the same method as in FIG. 2B. After drying the application film, the glass substrate was baked in a baking furnace at 400° C. for 1 hour. UV light was irradiated to the composite oxide film formed as described above, and a light transmittance property equivalent to the light transmittance property shown in Second Embodiment was obtained.

Figure 5B:
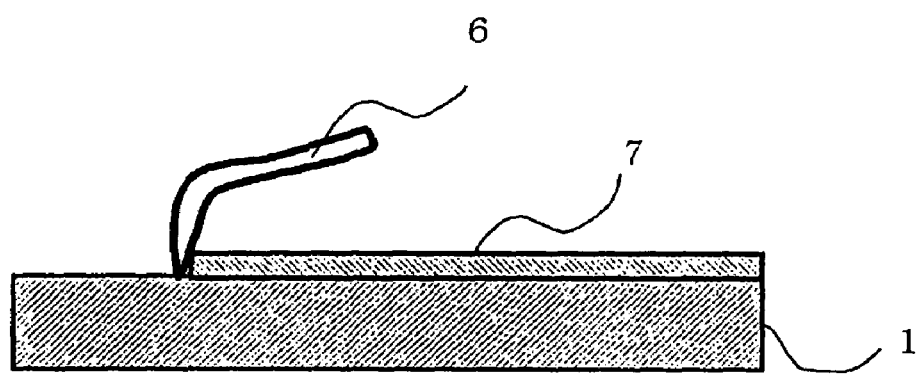

The photochromic material as shown in First Embodiment and Second Embodiment may be obtained by peeling the photochromic film from the glass substrate 1 using a metallic scraper 6, and by pulverizing the peeled photochromic film into a fine powder as shown in FIG. 5B.

Fourth Embodiment

FIG. 4 shows an example of use of the scale-like photochromic material with a size of about 1 μm obtained in First Embodiment to Third Embodiment.

Figure 7:
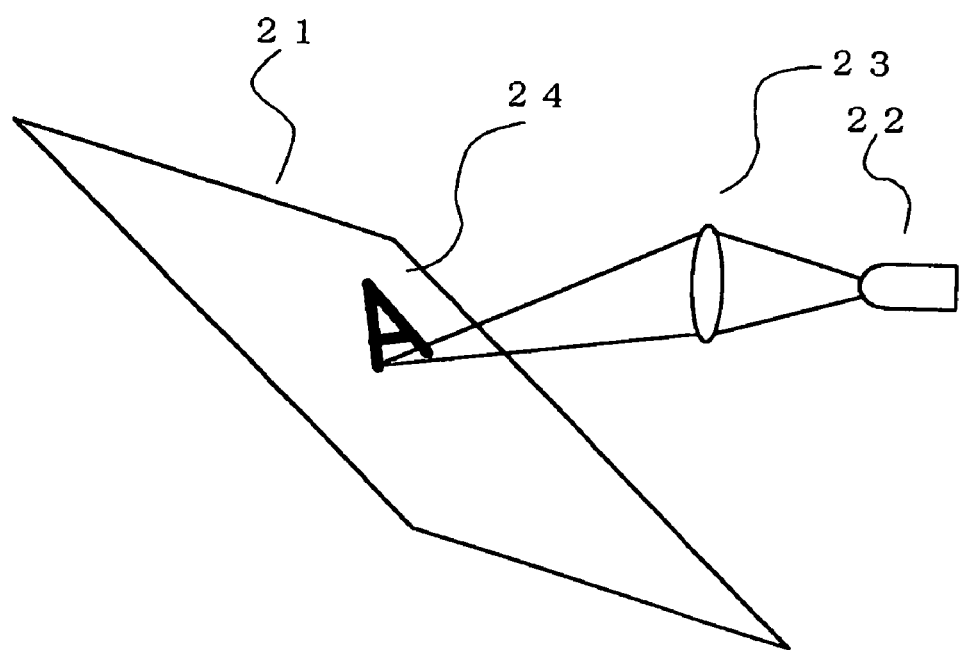
FIG. 7 shows an example for drawing a letter on a sheet of paper on which the photochromic material according to the present invention is applied.

The scale-like photochromic material was mixed with a solvent inert to the photochromic material, and the solution is applied on a sheet of paper 21 followed by drying. A binder may be appropriately mixed with the photochromic material so that the photochromic material is not peeled off. The sheet of paper prepared as described above was scanned with a light from a UV light source 22 converged with a lens 23 to draw a pattern (character and picture) 24 on the sheet of paper 21 as shown in FIG. 7. The UV light source may be a laser diode or any other short wavelength light sources. Since the printing procedure is simplified as compared with the conventional Carlson process using a toner, the size, weight, cost and consumed electric power of the printing machine may be largely reduced.

Figure 8:
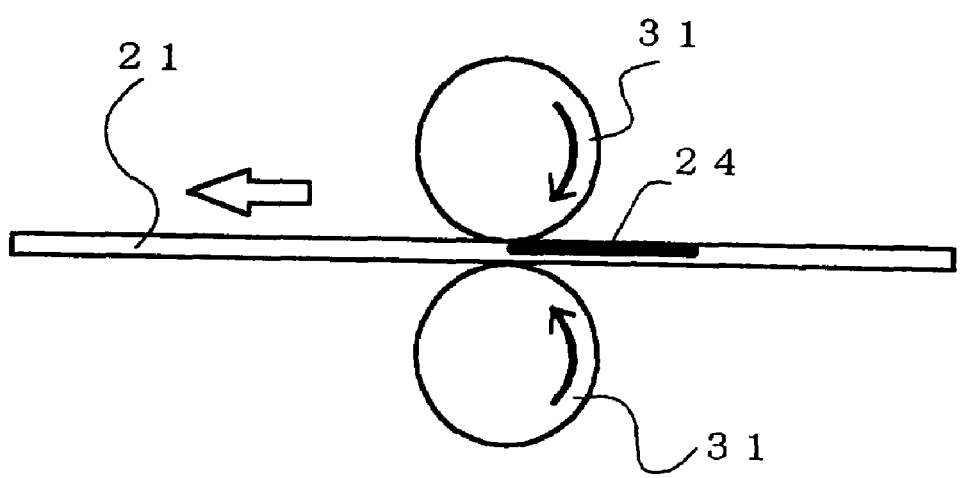
FIG. 8 shows an example for erasing the written letter in FIG. 7.

The pattern drawn in the method in FIG. 7 may be erased by passing the sheet of paper between hot rollers 31 as shown in FIG. 8. It is an advantage that recycling of the sheet of paper is facilitated since the pattern may be written again in the step shown in FIG. 7. An infrared laser may be irradiated for erasing the written pattern. The same drawing is possible by applying the photochromic material on a fabric in place of the sheet of paper.

The photochromic material comprising the scale-like composite oxide may be mixed with an organic resin to form it into a sheet, or the sheet may be laminated with a sheet of metal, glass, ceramic and resin.

Fifth Embodiment

A light-shielding glass for buildings may be produced by forming the photochromic film or material according to First Embodiment to Third Embodiment on a sheet of soda lime glass, and by irradiating UV light by controlling the luminous energy of UV light so that an arbitrary illuminance of the light can permeate the glass.

The light shielding film comprising the photochromic film may be formed on a bottle for chemicals in place of forming on the sheet of glass, in order to use the bottle for preserving substances susceptible to light. A glass product having arbitrary color tone and gradation may be manufactured by adding pigments such as iron oxide, cobalt oxide and phthalocyanine in the application fluid. More complex color control is possible by drawing a pattern on the application film using an ethyl alcohol immediately after coating. The dim glass prepared by the method according to the present invention is excellent in mechanical strength, solvent resistance and heat resistance as compared with conventional glass products comprising a resin and pigment coated on the surface.

A photochromic film or material can be obtained according to the present invention that has been described in detail, wherein the photochromic is modified from transparent to opaque by UV light irradiation, and opaque to transparent by heating, by forming a composite oxide comprising at least two elements as well as a transparent conductive material. The transparency of the photochromic film or material is not changed under room light.

What is claimed is:

1. A photochromic material comprising a powder containing a composite oxide of Mg and at least one element selected from the group consisting of Ti, Mn, Co, Ni, Zn, and Sn, the composite oxide containing transparent conductive particles.

2. The photochromic material according to claim 1, wherein the composite oxide comprises tin and magnesium.

3. The photochromic material according to claim 2, wherein the ratio of the number of tin atoms to the number of magnesium atoms contained in the composite oxide is in the range of 3:7 to 7:3.

4. The photochromic material according to claim 3, wherein the proportion of defects of oxygen atoms in the composite oxide is 1% to 70%.

5. The photochromic material according to claim 2, wherein the transparent conductive particles comprise indium oxide as a main component.

6. The photochromic material according to claim 1, wherein the transparent conductive particles comprise indium oxide as a main component.

7. A photochromic material comprising a powder containing a composite oxide of Ti and Mg, the composite oxide containing transparent conductive particles comprising indium oxide as a main component.

* * * * *

UNITED STATES PATENT AND TRADEMARK OFFICE
CERTIFICATE OF CORRECTION

PATENT NO. : 7,335,322 B2  Page 1 of 1
APPLICATION NO. : 11/369789
DATED : February 26, 2008
INVENTOR(S) : Nakazawa et al.

It is certified that error appears in the above-identified patent and that said Letters Patent is hereby corrected as shown below:

On the Title Page

Under "Related U.S. Application Data Item (62)," delete "Mar. 15, 2003" and insert --May 15, 2003--.

On the Title Page

Insert the following Item --(30) Foreign Application Priority Data:

JP 2002-159484; 05/31/2002; JP 2002-348598; 11/29/2002--.

Signed and Sealed this

Twenty-fourth Day of June, 2008

JON W. DUDAS
*Director of the United States Patent and Trademark Office*